United States Patent [19]

Nishino et al.

[11] Patent Number: 4,476,169
[45] Date of Patent: Oct. 9, 1984

[54] MULTILAYER GLASS STRUCTURE

[75] Inventors: Hiroshi Nishino, Osaka; Fumiichi Ogino, Kawanishi; Tetsuo Masuko, Shibata; Kunio Goto, Nakajo; Masao Takahashi, Shiunjimachi, all of Japan

[73] Assignees: Takeda Chemical Industries, Ltd.; Mizusawa Kagaku Kogyo Kabushiki Kaisha, both of Osaka, Japan

[21] Appl. No.: 390,932

[22] Filed: Jun. 22, 1982

[30] Foreign Application Priority Data

Jun. 23, 1981 [JP] Japan ................................. 56-96031
May 24, 1982 [JP] Japan ................................. 57-86587

[51] Int. Cl.³ .......................... E06B 3/24; B32B 5/14
[52] U.S. Cl. ........................................ 428/34; 52/172; 428/404; 428/407; 502/68
[58] Field of Search ................. 428/49, 38, 34, 404, 428/407; 252/455 Z; 52/171, 172; 156/109; 502/68

[56] References Cited

U.S. PATENT DOCUMENTS 4,076,892 2/1978 Fennimore et al. ............... 428/407
4,123,390 10/1978 Sherman et al. ............... 252/455 Z
4,151,690 5/1979 Schoots ............................. 428/34

Primary Examiner—Marion E. McCamish
Assistant Examiner—William M. Atkinson
Attorney, Agent, or Firm—Sherman & Shalloway

[57] ABSTRACT

A multilayer glass structure constructed by joining the edge portions of a plurality of glass sheets by a sealant through spacers having an adsorbent filled therein. According to this invention, the adsorbent comprises a combination of a granular zeolite composed of a core of a synthetic zeolite/clay binder mixture containing the synthetic zeolite in an amount larger than its average content in the granular zeolite and a shell of a synthetic zeolite/clay binder mixture containing the clay in an amount larger than its average content in the granular zeolite, with granular activated carbon having on its surface 1 to 20% by weight, based on the activated carbon, of a coating of a synthetic resin latex. The adsorbent can effectively adsorb water vapor and the vapor of an organic solvent evaporated from the sealant, and prevent dew deposition on the glass surface. Moreover, it does not yield dust even when the glass structure is handled under severe conditions.

9 Claims, 8 Drawing Figures

UNIT: mm

MULTILAYER GLASS STRUCTURE

BACKGROUND OF THE INVENTION

1. Field of the Invention

This invention relates to a multilayer glass structure, and more specifically, to a multilayer glass structure which is so constructed as to prevent effectively not only the condensation of water vapor and vapor of an organic solvent in spaces within the glass structure but also the occurrence of dust from an adsorbent included in the glass structure.

2. Description of the Prior Art

A multilayer glass structure constructed by joining the edge portions of a plurality of glass sheets by a sealant through spacers having a dessicant included therein has been used heretofore in various buildings as a windowpane having excellent thermal and acoustic insulating effects.

One problem with this multilayer glass structure is that when the temperature of air in the spaces between the glass sheets decreases to below the dew point, vapors in these spaces are condensed to reduce the visual field of the windowpane. It is known that such vapors include not only water vapor in the air originally existing in the spaces between the glass sheets and water vapor contained in the air leaking through the spaces between the glass sheets and the spacers, but also vapor of an organic solvent which is contained in the sealant and evaporated with the lapse of time.

It is known to use synthetic zeolites, active alumina, silica gel, etc. as dessicants or adsorbents for the adsorption of these vapors. These adsorbents, however, have not proved to be entirely satisfactory for the purpose of absorbing and removing a mixture of water vapor and an organic solvent vapor in such a way as to prevent "fogging" despite a wide range of temperature variations. For example, it is said that among the above-mentioned adsorbents, silica gel is most suitable for the adsorption of an organic solvent vapor. But in a system including both water and an organic solvent, silica gel tends to adsorb water selectively and preferentially, and therefore, its effect is questionable in the adsorption of both.

From this viewpoint, the use of a combination of adsorbents for a multilayer glass structure has already been proposed. For example, Japanese Laid-Open Patent Publication No. 71650/1980 discloses the use of a combination of 3A-type molecular sieve zeolite with hydrocarbon-adsorptive silica gel, active alumina or activated carbon or a mixture of such hydrocarbon-adsorptive adsorbents, and suggests that activated carbon should be used carefully so as not to permit it to come out of the spacers because its color is unusual.

In addition to the aforesaid absorbing property in a system containing both water vapor and an organic solvent vapor, adsorbents for multilayer glass structures present the problem of giving off dust. Zeolite, activated carbon, etc. are liable to yield dust, although to varying degrees, when subjected to vibration, etc. imparted during the transportation and setting of multilayer glass structures or during their use as windowpanes. Unfortunately, the dust comes into the spaces between the glass sheets through adsorbing openings provided in the spacers, and adheres to the glass surfaces to reduce vision or form a nucleus that accelerates fogging.

Certainly, some proposals have previously been made as to adsorbents for multilayer glass structures, but to the present inventors best knowledge almost nothing has been proposed about the prevention of such dust occurrence.

SUMMARY OF THE INVENTION

It is an object of this invention therefore to provide a multilayer glass structure which exhibits an excellent property of adsorbing water vapor and vapor of an organic solvent in the spaces of the glass structure, and in which the occurrence of dust is effectively prevented even when the glass structure is handled under severe conditions.

Another object of this invention is to provide a multilayer glass structure in which a combination of coated granular zeolite and coated granular activated carbon is filled as an adsorbent in spacers having an opening for the adsorption of vapors.

According to this invention, there is provided a multilayer glass structure consisting of a plurality of glass sheets joined at their edge portions through spacers and sealed by a sealant between their edge portions and the outer surfaces of the spacers, that spacer which is located in at least one side of the glass sheets having an adsorbent filled therein; characterized in that said adsorbent comprises a combination of a granular zeolite composed of a core of a synthetic zeolite/clay binder mixture containing the synthetic zeolite in an amount larger than its average content in the granular zeolite and a shell of a synthetic zeolite/clay binder mixture containing the clay binder in an amount larger than its average in the granular zeolite content, with granular activated carbon having on its surface 1 to 20% by weight, based on the activated carbon, of a coating of a synthetic resin latex.

BRIEF DESCRIPTION OF THE ACCOMPANYING DRAWINGS

DETAILED DESCRIPTION OF THE INVENTION

Figure 2:
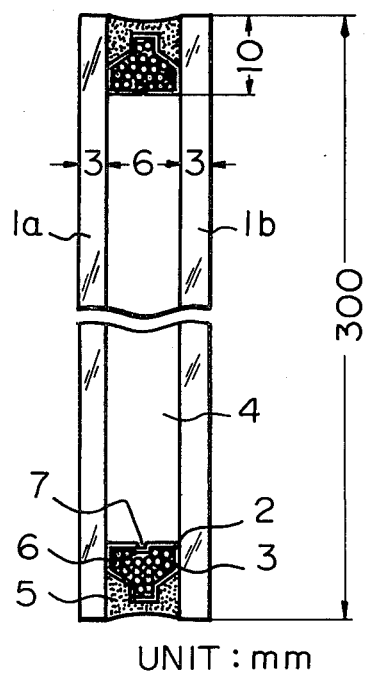
FIGS. 1 and 2 are a three-dimensional view and a sectional view, respectively, of the multilayer glass structure used in Example 1 of this application, in which the numerical figures between arrows show sizes in mm.
Figure 1:
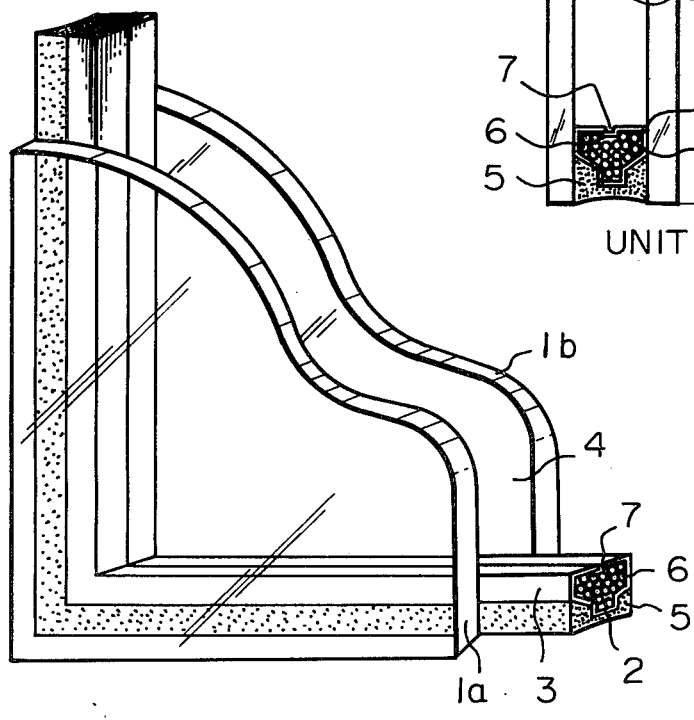

With reference to FIGS. 1 and 2 showing the structure of the multilayer glass structure of this invention, a pair of glass sheets 1a and 1b ae laid together through a spacer member 2 disposed at four sides of the glass sheets. A double-sides adhesive tape 3 is disposed between the side surface of the spacer member 2 and the inside surface of the glass sheet to bond the spacer 2 to the inside surface of the glass sheet. Thus, a space 4 of a certain width determined by the spacer 2 is formed between the two glass sheets 1a and 1b.

A sealing agent or sealant 5 is applied to the edge portion of the glass-spacer assembly, i.e. to the outer surface of the spacer 2, thereby sealing the space 4 between the glass sheets 1a and 1b by the sealant 5.

The spacers 4 are hollow in structure, and an adsorbent 6 is filled in the inside hollow portion of at least one of the four spacers 2 located at the four side edge portions of the glass sheets 1a and 1b. The spacer 2 containing the adsorbent 6 has a small opening 7 for vapor adsorption which communicates with the space 4.

According to this invention, water vapor and organic solvent vapor evaporated from the sealant 5, which are present in the space 4 of the multilayer glass structure, can be completely adsorbed by the adsorbent 6 which consists of a combination of coated granular zeolite and coated granular activated carbon to be described in detail hereinbelow. As a result, fogging caused by the condensation of such vapors at low temperatures and consequent dew deposition can be prevented, and moreover, even when the multilayer glass structure is handled under severe conditions, the occurrence of dust and various troubles attributed to it can be effectively eliminated.

The coated granular zeolite and the coated granular activated carbon can be used to be present in any desired ratio in the multilayer glass structure. Good results can be obtained in regard to the prevention of dew formation when they are present in a weight ratio of from 95:5 to 30:70, especially from 90:10 to 40:60.

GRANULAR ZEOLITE

Figure 3:
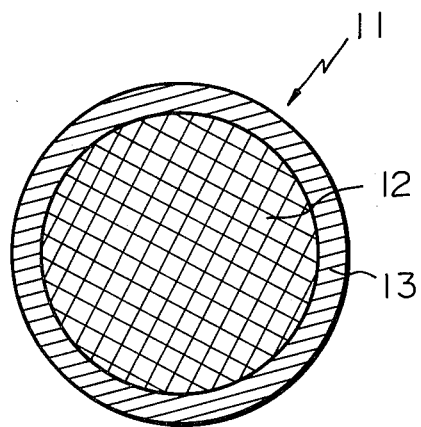
FIG. 3 is a view showing the sectional structure of the granular zeolite used in this invention.

With reference to FIG. 3 showing the sectional structure of the granular zeolite used in this invention, the granular zeolite shown at 11 has a sectional structure composed of a core 12 and a shell 13. The marked characteristic of the granular zeolite is that the core 12 contains a synthetic zeolite in a proportion larger than its average content in the entire granular zeolite and the shell 13 contains a clay binder in a proportion larger than its average content in the entire granular zeolite. Specifically, the granular zeolite used in this invention is characteristic over a conventional granular zeolite comprising a synthetic zeolite and a clay binder present at the same ratio throughout its entire section in that it exhibits markedly improved powderization resistance (abrasion resistance) and compression strength as a result of adjusting the proportion of the clay binder in the shell to a value larger than its average content in the granular zeolite, and shows better zeolitic properties such as a combination of high absorption rate and absorptive capacity as a result of adjusting the proportion of the synthetic zeolite in the core to a value larger than its average content in the granular zeolite. Such improvements in a combination of the mechanical properties and zeolitic properties can also be achieved when the shell has a very small thickness.

It is also important from the standpoint of the speed of adsorption that the shell of this granular zeolite is formed of a mixture of the clay binder and the synthetic zeolite. In fact, it is observed that the granular zeolite used in this invention has a considerably higher speed of adsorption than a granular zeolite whose shell is composed solely of the clay binder. This is presumably because the synthetic zeolite present in the shell serves as a passage for a substance to be adsorbed. The constitution of the core by a mixture of the synthetic zeolite and the clay binder is also important in order to increase the strength of the entire granular zeolite. It should be understood that the granular zeolite used in this invention permits a marked decrease in the total content of the clay binder and shows a marked improvement in adsorption speed and adsorptive capacity in comparison with a conventional granular zeolite having the same level of powderization resistance (abrasion resistance) and compression strength, and that is has markedly improved powderization resistance (abrasion resistance) and compression resistance in comparision with a conventional granular zeolite having the same level of adsorptive capacity.

The ratio of the core to the shell in the granular zeolite used in this invention differs slightly depending upon the particle diameter of the granular zeolite. Generally, the suitable weight ratio of the core to the shell is within the range of from 99:1 to 80:20, especially within the range of from 98:2 to 85:15. When the proportion of the shell is small, the mechanical properties, such as powderization resistance, of the granular zeolite tend to be deteriorated, and when it is larger, its zeolitic properties such as adsorptive power tend to be deteriorated. The proportion of the shell can be adjusted to relatively small values when the particle diameter of the granular zeolite as a whole is large, and can be adjusted to relatively large values when its particle diameter is small.

The mixture constituting the core 12 of the granular zeolite used in this invention contains the synthetic zeolite and the clay binder in a weight ratio of from 90:10 to 60:40, especially from 88:12 to 70:30. The mixture constituting the shell 13, on the other hand, contains the clay binder and the synthetic zeolite in a weight ratio of from 95:5 to 30:70, especially from 70:30 to 50:50. Desirably, in order to provide a balanced combination of mechanical strength and zeolitic properties, the shell should contain the clay binder in an amount at least 10%, especially at least 15%, by weight larger than the clay binder content of the core.

The synthetic zeolite used in this invention may, for example, be one or more of zeolite A, zeolite X, zeolite Y, and synthetic mordenite. Cations of these zeolites can exist in any desired form such as a sodium, potassium or calcium form. The synthetic zeolite used in this invention has a particle size of generally 0.01 to 100 microns, especially 0.1 to 50 microns.

Examples of the clay binder used in this invention include kaolinite-group clay minerals such as kaolin, palygorskite-group clay minerals such as attapulgite, smectite-type clay minerals such as acid clay, montmorillonite and bentonite, and allophane. They can be used singly or in a combination of two or more. The clay binder used has a particle diameter of 0.1 to 10 microns, especially 0.5 to 5 microns.

In the production of the granular zeolite used in this invention, a synthetic zeolite/clay binder mixture having the aforesaid composition for core formation is granulated into core particles using an aqueous solution of a water-soluble polymeric binder as a granulating medium. Mixing of the synthetic zeolite with the clay binder can be effected by a dry-blending method using a known mixer such as a ribbon blender, a conical blender or a Henschel mixer. The mixture can be granulated in the aforesaid aqueous solution of polymeric binder as a granulating medium by granulating means known per se, such as tumbling granulation, extrusion granulation, spray granulation, tableting granulation, fluidization granulation, etc. In view of the mechanical strength of the granular zeolite, the tumbling granulating method is especially preferred. Granulation is performed by first preparing seed particles of the aforesaid synthetic zeolite/clay binder mixer, and adhering a powder of the above mixture to the seed particles wetted with the granulating medium, thereby to grow the particles.

The water-soluble polymeric binder can be used in an amount of 0.01 to 5% by weight, especially 0.05 to 2% by weight, as solids, based on the total weight of the synthetic zeolite and the clay binder. The amount of the aqueous solution used as the granulating medium differs depending upon the granulating means, but is preferably 20 to 70% by weight, especially 30 to 60% by weight, based on the total weight of the synthetic zeolite and the clay binder.

Examples of useful water-soluble polymeric binders are starch, cyanoethylated starch, carboxymethylated starch, carboxymethyl cellulose, methyl cellulose, hydroxyethyl cellulose, polyvinyl alcohol, a vinyl ether/maleic acid copolymer, sodium alginate, sodium lignosulfonate, gum arabic and tragacanth gum.

The core particles obtained by the above method are dry-blended with a powder mixture of the synthetic zeolite and the clay binder having the aforesaid composition for shell formation to form a coating of the powdery mixture on the surface of the core particles. The amount of the powdery mixture to be blended with the core particles is within the range already specified hereinabove. The core particles prepared by the above procedure still contains the solution used as the granulating medium, and by this solution, the powder of the shell-forming mixture adheres firmly to the surface of the core particles to form a coating. Preferably, the dry-blending of the core particles with the powdery mixture can be easily performed by charging the powdery mixture, at a time or in a multiplicity of portions, into a tumbling granulator including the as-formed core particles, and operating the granulator.

In preparing the coated granular zeolite, the synthetic zeolite and clay binder forming the shell may be the same as, or different from, the synthetic zeolite and the clay binder forming the core.

The resulting granular product of the core-shell structure is dried in the air, and then calcined at a temperature of 300° to 650° C. for 10 to 300 minutes to obtain a final granular zeolite product.

Desirably, the granular zeolite has a particle size of generally 5 to 32 mesh on a Tyler's standard sieve.

GRANULAR ACTIVATED CARBON

Figure 4:
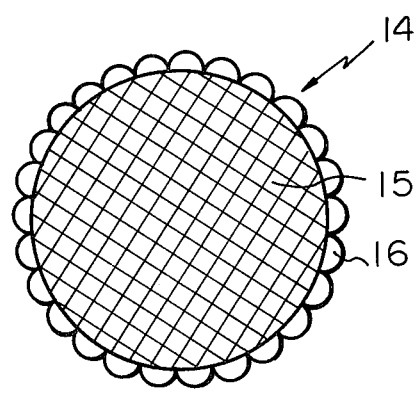
FIG. 4 is the sectional view of the granular activated carbon used in this invention.

With reference to FIG. 4 showing the sectional structure of the granular activated carbon used in the present invention, the granular activated carbon shown at 14 is composed of granular active carbon 15 and a synthetic resin latex coating 16 formed on its surface. The marked characteristic of this coating 16 is that because it is formed of a synthetic resin latex, it can greatly inhibit the occurrence of dust without substantially reducing the adsorptive power of activated carbon for an organic solvent. This advantage will become immediately clear from the results of working examples to be given hereinbelow.

It has not been fully clear why the granular activated carbon used in this invention has improved powderization resistance without a marked reduction in its adsorptive power for an organic solvent. It is presumed however that since the coating 16 is derived from a synthetic resin latex, it is in the form of a film having a number of pores or a netting, it is permeable to a vapor of an organic solvent but acts as a coating sufficient to prevent wear of activated carbon, and moreover this coating acts as a cushioning material for absorbing shock, etc.

The granular activated carbon itself used in this invention may be obtained from coal, petroleum residues, charcoal, fruit shells, etc. by an activating method using any of a gas such as steam or carbon dioxide gas and a chemical such as zinc chloride and phosphoric acid. It may have a BET specific surface area of 500 to 2,000 $m^2/g$ and a particle size of 4 to 30 mesh and be in a spherical, cylindrical or irregular form. From the viewpoint of powderization resistance, spherical particles of activated carbon are especially preferred.

The synthetic resin latex coating agent is an aqueous emulsion of a synthetic resin, and one, or a combination of two or more, of the following synthetic resins can, for example, be used as the synthetic resin.

(1) A butadiene polymer, or a copolymer of butadiene with styrene, a styrene derivative, acrylonitrile, methacrylonitril, isoprene, isobutylene, etc.

(2) A copolymer of isoprene with styrene or a styrene derivative.

(3) A chloroprene polymer, or a copolymer of chloroprene with styrene, a styrene derivative, acrylonitrile or isoprene.

(4) A copolymer of an acrylate ester with styrene, a styrene derivative, vinyl chloride, vinyl acetate, acrylonitrile, or a methylacrylate ester.

(5) A methacrylonitrile polymer and a copolymer of methacrylonitrile with styrene, etc.

(6) A vinyl acetate polymer, and a vinyl chloride polymer.

These synthetic resins may be carboxy-modified or modified by other suitable treatments.

The amount of the latex used is 1 to 20% by weight, preferably 2 to 5% by weight, as solids based on the weight of the activated carbon itself. If the amount of the latex is less than 1% by weight, the effect of improving powderization resistance is small. When it is more than 20% by weight, the effect of improving powderization resistance is great, but the gas adsorbing ability of the product is reduced.

The suitable solids concentration of the latex used is 10 to 50% by weight, and the amount of the latex used is preferably 0.2 to 1.0 times the weight of the activated carbon.

Coating of the surface of the activated carbon may be performed by spraying the latex onto the surface of the activated carbon by a suitable method, or impregnating the activated carbon in the latex. The coated product is then dried at 100° to 150° C. to give coated granular activated carbon having improved powderization resistance.

COMBINATION ADSORBENT

The granular zeolite used in this invention has the property of adsorbing a very large amount of water even when the humidity is extremely low, and also of a adsorbing a fixed amount of water almost irrespective of the relative humidity of $H_2O$ (i.e., the partial pressure of water vapor per saturated water vapor pressure at 20° C.). On the other hand, the granular activated carbon has the property of adsorbing a much larger amount of an organic solvent such as xylene and methyl ethyl ketone than other adsorbents, and of adsorbing a fixed amount of the organic solvent almost irrespective of the specific pressure of the organic solvent vapor. In addition, the granular activated carbon has the property of selectively adsorbing organic solvents even in the presence of a water vapor.

Thus, by using the granular zeolite and the granular activated carbon in combination in accordance with this invention, vaporous components within a multilayer glass structure are most effectively adsorbed, and dew deposition on the glass or fogging can be prevented stably over a long period of time even when the temperature varies considerably.

Furthermore, the granular zeolite and granular activated carbon used in this invention have excellent powderization resistance against handling under severe conditions. In addition, even a mixture of these materials having different properties shows outstandingly good powderization resistance, and the occurrence of dust is scarcely observed even during handling under severe conditions.

In the present invention, the granular zeolite and the granular activated carbon can be caused to be present in any desired state in the multilayer glass structure so long as they exist together in the glass structure. Specifically, they can be present separately in different spaces within the spacer of the glass structure, or they may be present as a mixture in the same space in the spacer. For example, in the former case, the granular activated carbon may be filled in a spacer portion located at the lower side of the glass structure, and the granular zeolite, in a spacer portion located at the upper or lateral side of the glass structure. According to this embodiment, segregation between the granular zeolite and the granular activated carbon and the consequent nonuniformity in composition can be prevented, and abrasion or powderization which may be caused by the mixing of the dissimilar materials can be completely prevented.

In the latter case, the operation of producing the multilayer glass structure becomes easy if the granular activated carbon and the granular zeolite are mixed in advance at a predetermined ratio.

The adsorbent used in the multilayer glass structure of this invention may, as desired, contain another adsorbent in addition to the aforesaid essential components.

In one embodiment of this invention, not more than 70% by weight, especially 10 to 60% by weight, based on the total weight of the granular zeolite and the granular activated carbon, of granular alumina-silica gel is additionally used. This results in a further improvement in water adsorbing ability under high humidity conditions, and a multilayer glass structure having better adsorbing properties can be obtained. Such a granular alumina-silica gel is known per se, and those described in the specifications of Japanese Patent Publications Nos. 17002/1963, 16347/1965 and 8446/1972 can be suitably used.

The suitable amount of the combination adsorbent described hereinabove is generally 20 to 300 g, especially 40 to 200 g, per unit area ($m^2$) of the multilayer glass although it may vary depending upon the distance between adjacent glass sheets.

All sealants heretofore used in this type of multilayer glass structures can be used as the sealant in accordance with this invention. Examples include two-component type sealants based on polysulfide-type rubbers, one-component type elastic sealants based on butyl rubber, and one-component type elastic sealants based on urethane rubber. According to this invention, excellent ability to prevent dew formation can be obtained even when such sealants are of the organic solvent type.

The following examples illustrate the present invention in greater detail.

REFERENTIAL EXAMPLE 1

Twenty parts by weight of a dry powder of kaolin dried at 150° C. was mixed with 80 parts by weight of a dry powder of 4A-type synthetic zeolite dried at 150° C., and they were fully mixed by a V-shaped mixer to form a powdery mixture of synthetic zeolite and kaolin. A portion (about 25 kg) of the resulting powdery mixture was put in a tumbling granulator, and molded while spraying water by means of a spray nozzle. The product was sieved to remove fine particles and obtain spherical granules having a size of 0.25 to 0.5 mm.

The resulting spherical granules were used as a nucleus and tumbled by a tumbling granulator, and the powdery mixture prepared above and a 0.5% aqueous solution of sodium lignosulfonate were gradually added to the granules. In this way, a zeolite layer was grown on the surface of the nucleus over the course of 2 hours to produce a wet spherical zeolite core.

TABLE 1

| Powdery mixture as a shell component | |
|---|---|
| Invention | |
| S-1 | 95 parts by weight of kaolin and 5 parts by weight of zeolite |
| S-2 | 50 parts by weight of kaolin and 50 parts by weight of zeolite |
| Comparison | |
| S-3 | Kaolin alone |
| S-4 | Dried and calcined without coating |

Sixty kilograms of the core produced as above was put in a tumbling granulator, and while it was being tumbled, 3 kg of the powder S-1 shown in Table 1 was added to coat the surface of the core to give a spherical zeolite having a particle diameter of 0.3 to 3.0 mm. By a similar method, products coated with the powders S-2 and S-3 respectively were obtained. Also, a spherical zeolite having a particle diameter of 0.5 to 3.0 mm was produced without performing the aforesaid coating (the product is designated as S-4).

The resulting wet spherical zeolite was dried in the air (spontaneously dried), dried in an atmosphere kept at 100° to 150° C., for 3 hours, and then calcined at 550°±30° C. for 3 hours. The resulting abrasion-resistant zeolites were examined for compression strength, percent abrasion, packing density, equilibrium amount of water adsorption, water adsorption speed, and percent powderization by the following methods, and the results are shown in Table 2.

1. Compression strength

The compression breaking strengths of 20 samples were measured by a Kiya-type hardness meter (maximum measured value 10 kg; supplied by Kiya Seisakusho, Japan). The maximum and minimum measured values were excluded, and an average of the remaining 18 measured values was calculated and expressed as the compression strength.

2. Percent abrasion

A 150 ml glass vessel was charged with 40 g of the sample, to which water was adsorbed to saturation and which was then dried at 150° C. for 3 hours, and 100 ml of water. Then, the glass vessel was attached to a paint conditioner (supplied by Red Devil Inc.) and shaken for 30 minutes. After the powder adhering to the sample was removed, the sample was dried at 150° C. and its weight was measured. The percent abrasion (%) was calculated from the following equation.

$$\text{Percent abrasion (\%)} = \left(1 - \frac{\text{Weight of the sample after the wear test}}{\text{Weight of the sample before the test}}\right) \times 100$$

3. Packing density

A 500 ml graduated cylinder was charged with 200 g of the sample. The cylinder was placed on a rubber plate, and lightly tapped. The volume V (liter) of the sample was read when it no longer showed a change. The packing density of the sample was calculated from the following equation.

Packing density (g/liter) = 200/V

4. Equilibrium amount of water adsorption

The sample (0.15 g) was placed in a quartz microbalance water adsorption tester, and deaeration was carried out at 200° C. for 2 hours. Then, the equilibrium amount of water adsorption at a temperature of 20° C. and a relative humidity of 75% was calculated from the following equation.

$$\text{Equilibrium amount of water adsorption (\%)} = \frac{\text{Amount (g) of adsorbed water}}{\text{Amount (g) of the sample}} \times 100$$

5. Water absorption speed

The sample (0.15 g) having a particle size of 1.5 to 1.6 mm was placed in a quartz microbalance water adsorption tester, and deaeration was carried out at 200° C. for 2 hours. The amount (mg) of water adsorbed was measured at a temperature of 20° C. and a relative humidity of 20% every 1 minute. The time (in minutes) and the amount (in milligrams) of adsorbed water were plotted on the abscissa and ordinate, respectively, to obtain a water adsorption curve. The gradient of a straight line formed by connecting the amount of adsorbed water corresponding to an adsorption time of 10 minutes to the origin was determined, and defined as the water adsorption speed. The water adsorption speed was expressed in g/100 g of sample/min.

6. Percent powderization

Fifty grams of the sample which was caused to absorb moisture fully by being left to stand at room temperature for 48 hours was put in a standard sieve (JIS Z-8801). The sieve was mounted on a shaking machine, and subjected for 30 minutes to the rotating movement of the shaking machine and the impact force of the hammer. The weight loss of the sample was measured, and the percent powderization was calculated from the following equation.

$$\text{Percent powderization (\%)} = \frac{\left(\begin{array}{c}\text{Amount}\\\text{of the}\\\text{sample}\end{array}\right) - \left(\begin{array}{c}\text{Amount of the}\\\text{sample after}\\\text{the test}\end{array}\right)}{\text{Amount of the sample}} \times 100$$

More specific testing conditions were as follows:

Standard sieve (JIS Z-8801): containing of a 28-mesh sieve, a 60-mesh sieve and a 4-mesh sieve each having a diameter 15 cm stacked in this order. The sample was put in the 28-mesh sieve.

Amount of the sample: 50 g of the moisture-absorbed sample.

Shaking machine: the machine described in JIS R-6002 (1978); rotating speed 290 cycles/min.; the number of impacts 156/min.

TABLE 2

|  | Compression strength (kg) | Percent abrasion (%) | Packing density (g/l) | Equilibrium amount of water adsorption (%) | Water adsorption speed (g/100 g of sample/min.) | Percent powderization (%) |
| --- | --- | --- | --- | --- | --- | --- |
| Invention |  |  |  |  |  |  |
| S-1 | 5.1 | 1.7 | 880 | 18.20 | 0.90 | 0.3 |
| S-2 | 4.3 | 4.0 | 870 | 21.90 | 1.30 | 0.2 |
| Comparison |  |  |  |  |  |  |
| S-3 | 6.3 | 1.2 | 885 | 15.56 | 0.50 | 0.2 |
| S-4 | 2.0 | 12.8 | 840 | 22.80 | 1.49 | 2.8 |

It is seen from Table 2 that the 4A-type spherical zeolite S-3 produced in the comparative run is inferior in the equilibrium amount of water adsorption and water adsorption speed and the zeolite S-4 in the comparative run has a high percent powderization, and therefore, both of these zeolites are unsuitable as the adsorbent used for the objects of the present invention.

REFERENTIAL EXAMPLE 2

Sixty parts by weight of a dry powder of 4A-type synthetic zeolite was mixed fully with 40 parts by weight of a dry powder of kaolin in a V-shaped mixer to produce a powdery mixture of synthetic zeolite and kaolin. The resulting powdery mixture was molded by a tumbling granulator through the formation of a nucleus in the same way as in Referential Example 1 to produce a wet granular zeolite core. Sixty kilograms of the wet granular zeolite core was put in a tumbling granulator, and with tumbling, 6 kg of a powdery mixture of 50 parts by weight of kaolin and 50 parts by weight of synthetic zeolite for shell formation, prepared by thorough mixing, was added and coated on the surface of the wet granular zeolite core in the same way as in Referential Example 1 to form a spherical granulated product having a particle diameter of 1.5 to 3.0 mm. The product is designated as S-5.

For comparison, 50 parts by weight of a dry powder of 4A-type synthetic zeolite was fully mixed with 50 parts by weight of a dry powder of kaolin by a V-shaped mixer to prepare a powdery mixture of synthetic zeolite and kaolin. The powdery mixture was molded by a tumbling granulator through the formation of a nucleus in the same way as in Referential Example 1 to produce a wet spherical zeolite core. Sixty kilograms of the wet granular zeolite was put in a tumbling granulator, and with tumbling, 6 kg of a mixture of 60 parts by weight of kaolin and 40 parts by weight of synthetic zeolite, prepared by thorough mixing, was added and coated on the surface of the granular zeolite core in the same way as in Referential Example 1 to give a spherical granulated product having a particle diameter of 1.5 to 3.0 mm. This product is designated as S-6.

Each of S-5 and S-6 was dried and calcined in the same way as in Referential Example 1. The compression strength, percent abrasion, packing density, equilibrium amount of water adsorption, water adsorption speed and percent powderization of the products were measured as in Referential Example 1, and the results are shown in Table 3.

TABLE 3

| | Compression strength (kg) | Percent abrasion (%) | Packing density (g/l) | Equilibrium amount of water adsorption (%) | Water adsorption speed (g/100 g of sample/min.) | Percent powderization (%) |
| --- | --- | --- | --- | --- | --- | --- |
| S-5 (invention) | 9.5 | 0.7 | 890 | 17.5 | 0.85 | 0.1 |
| S-6 (comparison) | 12.6 | 0.5 | 900 | 14.5 | 0.40 | 0.1 |

It is seen from Table 3 that since the 4A-type spherical zeolite S-6 produced in the comparative run has a low percent powderization but is inferior in the equilibrium amount of water adsorption and the water adsorption speed, it is unsuitable as the adsorbent used for the objects of this invention.

REFERENTIAL EXAMPLE 3

Ninety parts by weight of a dried powder of 4A-type synthetic zeolite was mixed fully with 10 parts by weight of a dry powder of a smectite-group clay mineral by a V-shaped mixer to prepare a powdery mixture of synthetic zeolite and kaolin. The powdery mixture was molded in a tumbling granulator through the formation of a nucleus in the same way as in Referential Example 1 to produce a wet spherical zeolite core.

Sixty kilograms of the wet granular zeolite core was put in a tumbling granulator, and with tumbling, 6 kg of a powder S-7 shown in Table 4 as a shell-forming component was added and coated on the surface of the core in the same way as in Referential Example 1 to give a spherical zeolite having a particle diameter of 1.5 to 3.0 mm.

For comparison, a spherical zeolite was obtained by a similar method to the above using the powder S-8 shown in Table 4.

TABLE 4

| Designation | Powdery mixture as a shell-forming component |
| --- | --- |
| S-7 (invention) | 70 parts by weight of zeolite and 30 parts by weight of attapulgite |
| S-8 (comparison) | 80 parts by weight of zeolite and 20 parts by weight of attapulgite |
| S-9 (comparison) | 30 parts by weight of zeolite and 70 parts by weight of attapulgite |

For comparison, 95 parts by weight of a dry powder of 4A-type synthetic zeolite and 5 parts by weight of smectite-group clay mineral were fully mixed by a V-shaped mixer to prepare a powdery mixture of synthetic zeolite and kaolin. The powdery mixture was molded in a tumbling granulating machine through the formation of a nucleus in the same way as in Referential Example 1 to produce a wet spherical zeolite core. Sixty kilograms of the wet granular zeolite was put in a tumbling granulator, and with tumbling, 6 kg of the powder S-9 shown in Table 4 for shell formation was added and coated on the surface of the core in the same way as in Referential Example 1 to give a spherical zeolite having a particle diameter of 1.5 to 3.0 mm.

The compression strength, percent abrasion, packing density, equilibrium amount of water adsorption, water adsorption speed and percent powderization of the resulting products S-7, S-8 and S-9 were measured in the same way as in Referential Example 1, and the results are shown in Table 5.

TABLE 5

| | Compression strength (kg) | Percent abrasion (%) | Packing density (g/l) | Equilibrium amount of water adsorption (%) | Water adsorption speed (g/100 g of sample/min.) | Percent powderization (%) |
| --- | --- | --- | --- | --- | --- | --- |
| S-7 (invention) | 3.2 | 5.0 | 820 | 22.50 | 1.30 | 0.3 |
| S-8 (comparison) | 2.8 | 7.0 | 800 | 22.70 | 1.32 | 2.5 |
| S-9 (comparison) | 1.0 | 13.5 | 780 | 23.00 | 1.40 | 4.5 |

It is seen from Table 5 that the 4A-type spherical zeolites S-8 and S-9 produced in the comparative runs are unsuitable as the adsorbent used for the objects of this invention because they show a high percent powderization.

REFERENTIAL EXAMPLE 4

A synthetic rubber latex (a carboxyl-modified styrenebutadiene copolymer latex; solids concentration 47% by weight) was diluted with water to form a diluted emulsion having a solids concentration of 10% by weight. Then, 10 ml, 25 ml or 50 ml of the diluted emulsion was sprayed by a hand sprayer onto 100 g of spherical coal-base activated carbon having a BET specific surface area of 1,080 m$^2$/g and a particle diameter of 1.68 to 0.5 mm and obtained by a stream activating method, while the activated carbon was agitated. The activated carbon was then dried by an air bath dryer at 100° C. Thus, activated carbons S-10, S-11 and S-12 treated to reduce powderization and having different amounts of the latex used were obtained.

For comparison, 5 ml of the diluted synthetic rubber latex was sprayed onto 100 g of the same activated carbon as above by operating in the same way as above to give an activated carbon S-13 treated to reduce powderization and containing a different amount of the latex.

The following properties of the treated activated carbons were measured by the methods described. The results are shown in Table 6.

1. Abrasion resistant strength

The abrasion resistance of the sample was measured by a micro-strength method, and the percent powderization of the activated carbon particles was calculated and compared with that of a non-treated product (control).

Conditions for the measurement of micro-strength

Sample receptacle: A 150 ml stainless steel cylinder having a diameter of 25 mm and a height of 305 mm
Amount of the sample filled: 50 ml
Rotating speed: 20 rpm
Rotating time: 30 minutes
Total number of rotations: 600

Method of measuring the percent powderization $$\text{Percent powderization (\%)} = \frac{\left(\begin{array}{c}\text{Amount of}\\\text{the sample}\\\text{weighed}\end{array}\right) - \left(\begin{array}{c}\text{Amount of the}\\\text{sample after}\\\text{the measurement}\end{array}\right)}{\text{Amount of the sample weighed}} \times 100$$

The samples both before and after the measurement were those left on a 32-mesh sieve after sieving on it for 5 minutes using a Ro-Tap Sieve Shaker.

2. Equilibrium amount of acetone adsorbed

In accordance with the method of JIS K-1474, the equilibrium amount of acetone gas (37.5 g/m$^3$) adsorbed was measured at 25° C.

TABLE 6

| Sample No. | Amount of the latex used (solids, wt %) | Percent powderization (%) | Equilibrium amount of acetone adsorbed (%) |
|---|---|---|---|
| S-10 | 1.0 | 0.65 | 28.5 |
| S-11 | 2.5 | 0.12 | 28.3 |
| S-12 | 5.0 | 0.10 | 27.9 |
| S-13 (comparison) | 0.5 | 2.4 | 28.5 |
| Untreated activated carbon | 0 | 2.6 | 28.5 |

The treated activated carbon produced in the comparative run had the excellent ability to adsorb an organic gas as shown by its equilibrium amount of acetone adsorbed, but had low abrasion-resistant strength represented by its percent powderization. Hence, it is unsuitable as the adsorbent used for the objects of this invention.

REFERENTIAL EXAMPLE 5

A synthetic rubber latex (a carboxyl-modified butadiene-acrylonitrile copolymer latex; solids concentration 48% by weight) was diluted with water to prepare a diluted emulsion having a solids concentration of 20% by weight. Then, 75 ml or 100 ml of the diluted emulsion was sprayed by a hand sprayer on 100 g of coconut-base cylindrical activated carbon having a BET specific surface area of 1,150 m$^2$/g and a particle diameter of 2.38 to 1.68 mm and obtained by a steam activating method, while the activated carbon was agitated. The activated carbon was then dried in an air bath dryer at 100° C. Thus, activated carbons S-14 and S-15 treated to reduce powderization and having different amounts of the latex used were obtained.

For comparison, 83 ml of a diluted emulsion having a solids concentration of 30% by weight obtained by diluting the aforesaid synthetic rubber latex with water was sprayed onto 100 g of the same activated carbon as above to give an activated carbon S-16 treated to reduce powderization and having a different amount of the latex used.

In the same way as in Referential Example 4, the properties of the treated activated carbons were measured, and the results are shown in Table 7.

TABLE 7

| Sample No. | Amount of the latex used (solids, wt %) | Percent powderization (%) | Equilibrium amount of acetone adsorbed (%) |
|---|---|---|---|
| S-14 | 15.0 | 0 | 24.0 |
| S-15 | 20.0 | 0 | 15.0 |
| S-16 (comparison) | 24.9 | 0 | 4.5 |

The treated activated carbon produced in the comparative run had excellent abrasion-resistant strength shown by its percent powderization, but had the low ability to adsorb an organic gas shown by its equilibrium amount of acetone adsorbed. Hence, it is unsuitable as the adsorbent used for the objects of this invention.

REFERENTIAL EXAMPLE 6

Figure 5:
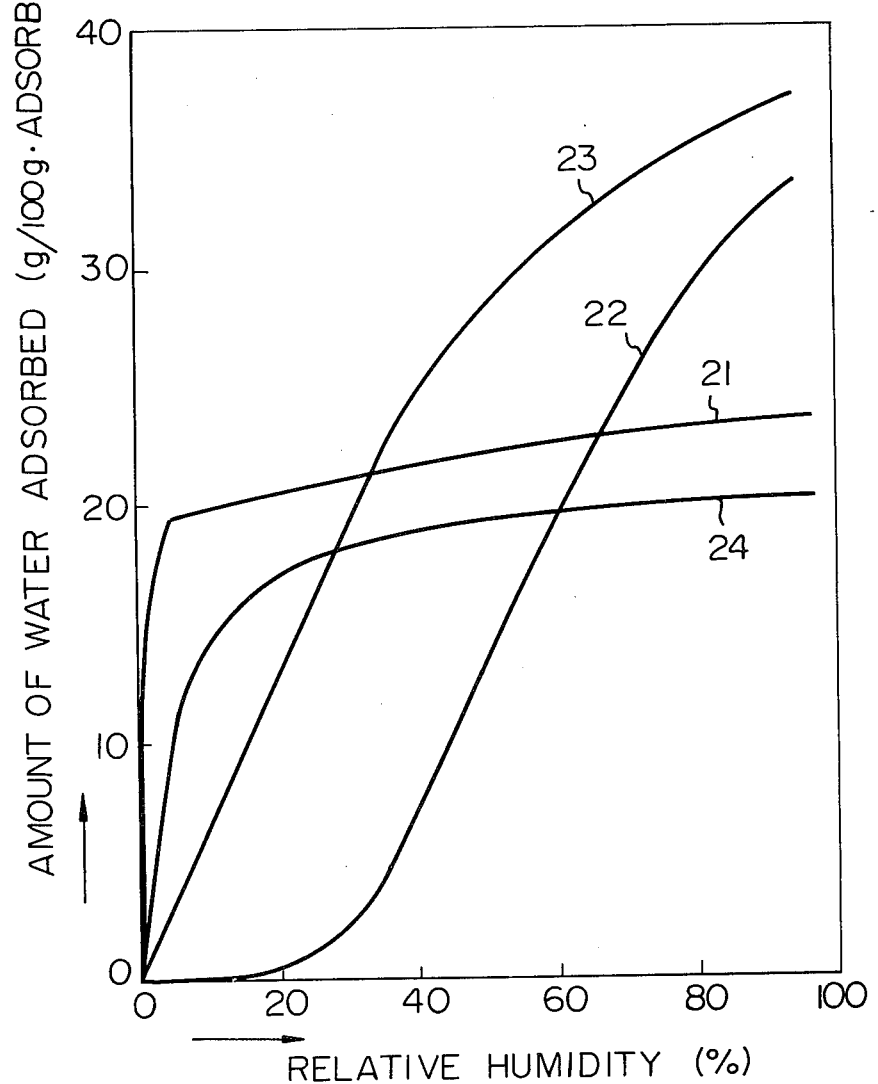
FIG. 5 is an adsorption isotherm of water in Referential Example 6.
Figure 6:
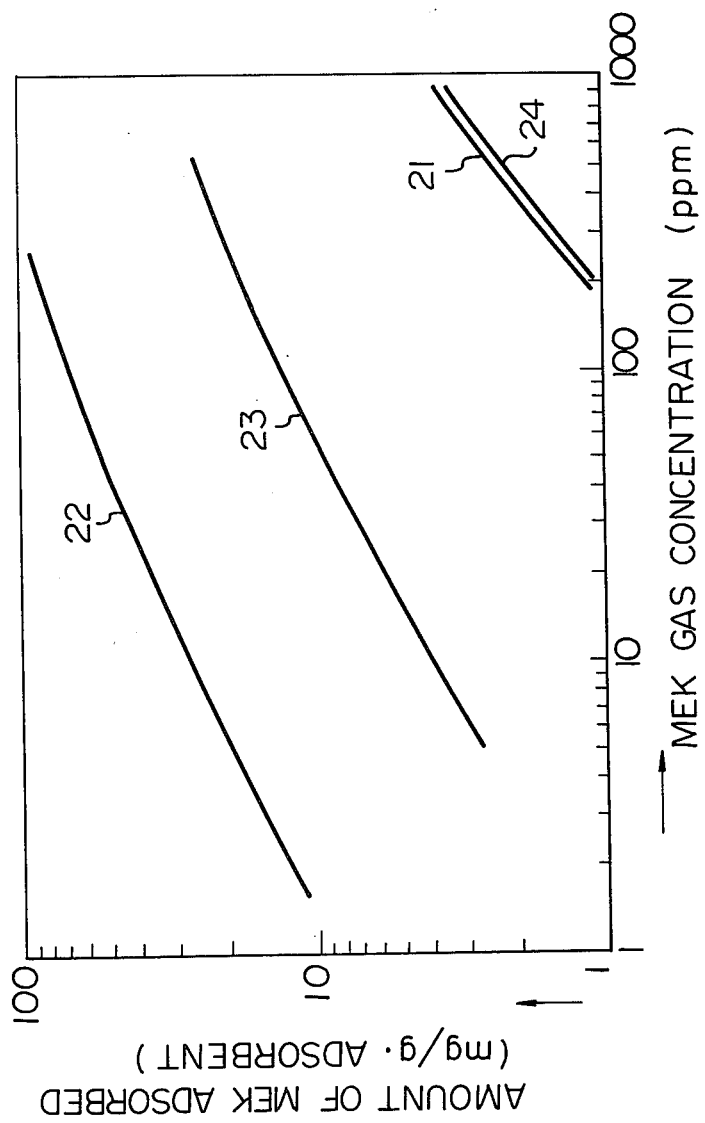
FIG. 6 is an adsorption isotherm of methyl ethyl ketone (MEK) in Referential Example 6.
Figure 7:
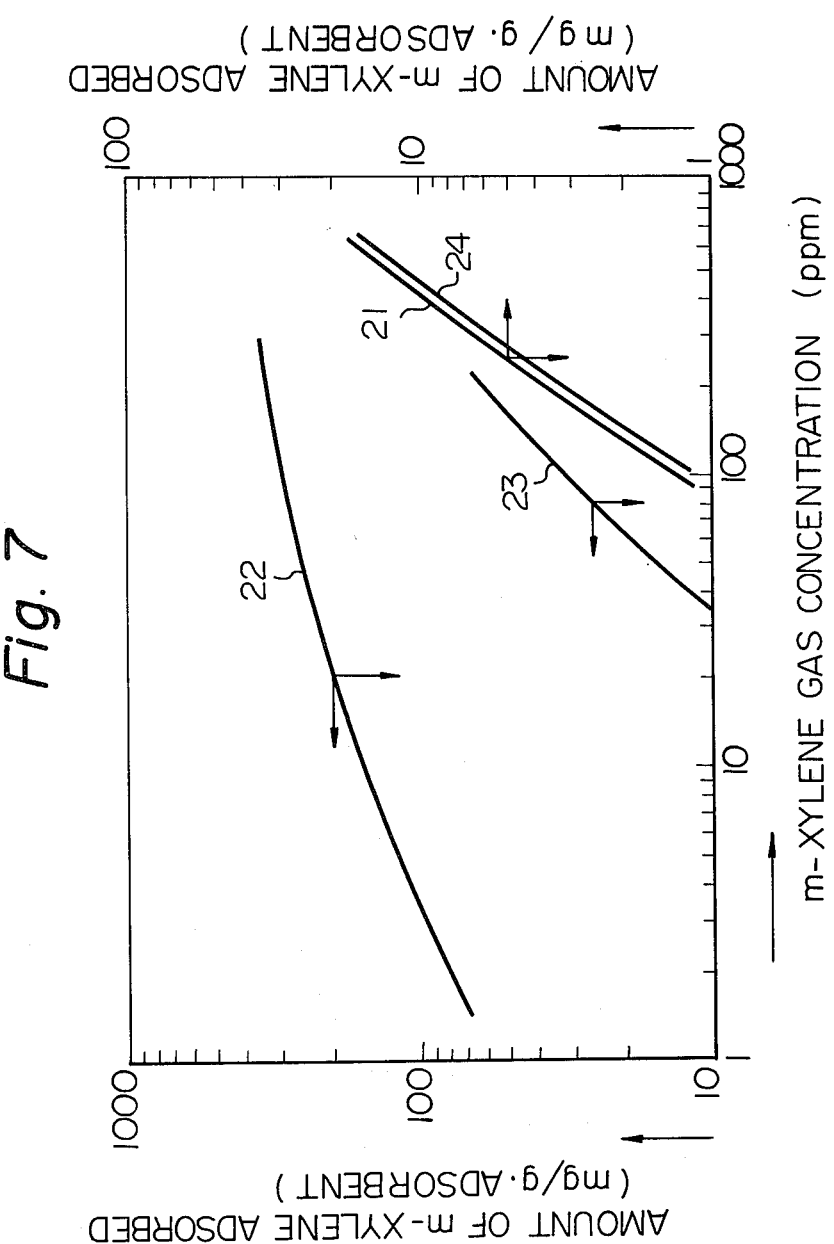
FIG. 7 is an adsorption isotherm of m-xylene in Referential Example 6.

The water absorption isotherms of the 4A-type spherical zeolite S-2 produced in Referential Example 1 and the treated spherical activated carbon S-12 are shown in FIG. 5. Furthermore, FIGS. 6 and 7 show the methyl ethyl ketone (MEK) and m-xylene (solvents for sealing agents for a multilayer glass structure) adsorption isotherms of the above zeolite S-2 and activated carbon S-12 at a relative humidity of 43% and 20% respectively. For comparison, the results obtained with commercially available 4A-type zeolite and silica gel are also shown in FIGS. 5, 6 and 7. In these Figures, the reference numeral 21 refers to the curve of the zeolite S-2; 22, the curve of the activated carbon S-12; 23, the curve of the commercially available silica gel; and 24, the curve of the commercially available 4A-type zeolite.

The above properties were measured by the following testing methods.

(1) Water adsorption isotherms

By using the quartz microbalance-type water absorption tester used in Referential Example 1, the equilibrated amount of water adsorbed at each relative humidity was measured.

(2) MEK or m-xylene adsorption isotherms

Figure 8:
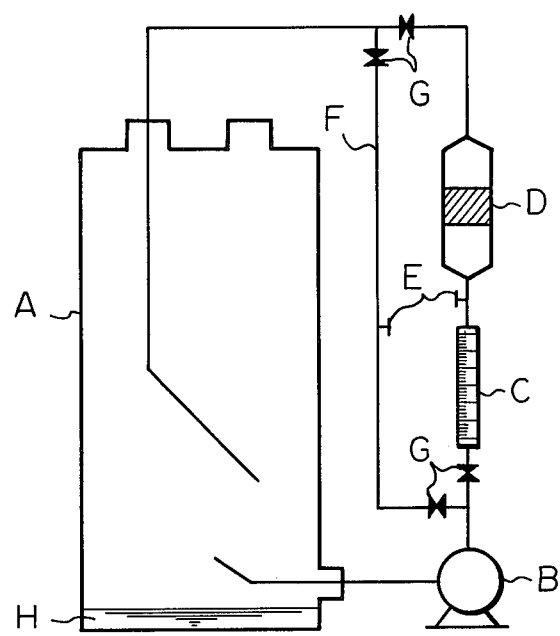
FIG. 8 shows the gas-circulating adsorption tester described in Referential Example 6.

By using the gas circulating-type adsorption testing device shown in FIG. 8, these isotherms were determined under the following conditions.

Measuring operation:

(1) By operating a gas flow passage switching cock G, the gas circulating passage in FIG. 8 was changed to a by-path flow passage F. About 2 grams of the sample was precisely weighed and filled in a sample column D made of glass and having a diameter of 37.5 mm. The column was then set in the device.

(2) A diaphragm pump B was operated, and while circulating air having a fixed humidity in a gas holder A, a predetermined amount of MEK or m-xylene was injected from a gas injecting port E. While continuing the circulation of the gas, the gas was sampled from the gas sampling port E and its concentration was analyzed by gas chromatography.

(3) When the concentration of the gas became steady, the cock G was operated to switch the gas flow passage over to the side of the sample column D. The gas was sampled every predetermined time to measure periodic variations in the concentration of the gas.

(4) When the concentration of the gas in the gas holder A became steady and reached an equilibrium, the cock G was operated to switch the gas flow passage over to the by-path F. Operations (2) and (3) were then repeated, and the equilibrium point of the concentration of the gas was meaured similarly.

(5) An equilibrium absorption curve could be obtained by the following procedure from the results of the above measurement.

In FIG. 8, the reference letter C represents a flow meter, and the reference letter H, a saturated potassium acetate solution (RH 20%) or a saturated potassium carbonate solution (RH 43%).

With regard to the results of the meaurement of the periodic variations of the concentration of the gas, the concentration of the gas at the time when it became steady was taken as the equilibrium concentration. From the amount of MEK or m-xylene injected until the equilibrium concentration was reached, the amount of MEK or m-xylene remaining in the system after the measurement, and also from the amount of the sample used in the measurement, the equilibrium amount of adsorption was calculated in accordance with the following equation, and plotted against the corresponding equilibrium concentration. Thus, an equilibrium adsorption curve was obtained.

$$Q = \frac{VCo(1 - Cs/Co)}{W}$$

wherein
Q: the equilibrium amount of adsorption (mg/g-adsorbent)
V: the total volume of the gas (liter)
Co: the initial concentration of the gas (mg/liter)
Cs: the equilibrium concentration of the gas (mg/liter)
W: the amount of the sample (g)

EXAMPLE 1

In a room kept at a temperature of 25° C. and a relative humidity of 50%, 15 g of a mixed adsorbent composed of 95% by weight of the 4A-type spherical zeolite S-2 having a particle diameter of 1.68 to 0.84 mm produced in Referential Example 1 and 5% by weight of the treated spherical activated carbon S-12 having a particle diameter of 1.68 to 0.50 mm produced in Referential Example 4 was filled in aluminum spacers for a multilayer glass structure of the type shown in FIGS. 1 and 2. By connecting the corner portions of the spacers by means of corner keys, a multilayer glass window frame was constructed. Then, those parts of the spacers to which glass sheets were to be bonded were fully cleaned by a cloth impregnated with toluene, and dried. Then, a double-sided adhesive tape was applied to the cleaned portions, and glass sheets having a thickness of 3 mm were bonded to the tape. A sealant obtained by fully kneading a polysulfide type (Thiokol) liquid polymer and a vulcanizer in a ratio of 100:10 was filled in the spaces between the spacers and the glass sheets by using a sealing gun, and then allowed to stand indoors for 24 hours to cure the sealant. Thus, a multilayer glass structure, 30 cm in length, 30 cm in width and 12 mm in thickness, was constructed. The dew point of the multilayer glass structure was measured under the following conditions in accordance with JIS R-3209 (1979), and the results are shown in Table 8.

Dew point measuring conditions:
(1) Initial dew point: After maintaining the sample at 20° C. for 12 hours, the dew point was measured.
(2) High temperature high humidity resistant test:
The dew point was measured after the sample was exposed for 14 days under the conditions 8·5·2 of JIS R-3209.

EXAMPLE 2

A multilayer glass structure, 30 cm in length, 30 cm in width, and 12 mm in thickness, was constructed in the same way as in Example 1 except that 7 g of a mixed adsorbent composed of 70% by weight of the 4A-type spherical zeolite S-5 having a particle diameter of 1.68 to 0.84 mm produced in Referential Example 2 and 30% by weight of the treated spherical activated carbon having a particle diameter of 1.65 to 0.50 mm produced in Referential Example 4 was filled in the spacers. The dew point of the glass structure was measured in the same way as in Example 1. The results are shown in Table 8.

EXAMPLE 3

A multilayer glass structure, 30 cm in length, 30 cm in width and 12 mm in thickness, was constructed in the same way as in Example 1 except that 10.0 g of a mixed adsorbent composed of 30% by weight of the 4A-type spherical zeolite S-2 having a particle diameter of 1.68 to 0.84 mm produced in Referential Example 1 and 70% by weight of the treated spherical activated carbon S-12 having a particle diameter of 1.68 to 0.50 mm produced in Referential Example 4 was filled in the spacers. The dew point of the glass structure was measured in the same way as in Example 1. The results are shown in Table 8.

EXAMPLE 4

A multilayer glass structure, 30 cm in length, 30 cm in width and 12 mm in thickness, was constructed in the same way as in Example 1 except that 12.0 g of a mixed adsorbent composed of 70% by weight of the 4A-type spherical zeolite S-2 having a particle diameter of 2.38 to 1.41 mm produced in Referential Example 1 and 30% by weight of the treated spherical activated carbon S-14 having a particle diameter of 2.38 to 1.41 mm produced in Referential Example 5 was filled in the spacers. The dew point of the glass structure was measured in the same way as in Example 1. The results are shown in Table 8.

COMPARATIVE EXAMPLE 1

A multilayer glass structure, 30 cm in length, 30 cm in width and 12 mm in thickness, was constructed in the same way as in Example 1 except that 15 g of the 4A-type spherical zeolite S-2 having a particle diameter of 1.68 to 0.84 mm produced in Referential Example 1 alone was filled as an adsorbent in the spacers. The dew point of the glass structure was measured in the same way as in Example 1. The results are shown in Table 8.

COMPARATIVE EXAMPLE 2

A multilayer glass structure, 30 cm in length, 30 cm in width and 12 mm in thickness, was constructed in the same way as in Example 1 except that 10.0 g of the treated spherical activated carbon S-12 having a particle diameter of 1.68 to 0.50 mm produced in Referential Example 4 alone was filled in the spacers. The dew point of the glass structure was measured in the same way as in Example 1. The results are shown in Table 8.

COMPARATIVE EXAMPLE 3

A multilayer glass structure, 30 cm in length, 30 cm in width, and 12 mm in thickness, was constructed in the same way as in Example 1 except that 15 g of a mixed adsorbent composed of 50% by weight of 4A-type spherical zeolite having a particle diameter of 1.68 to 0.84 mm and 50% by weight of spherical silica gel having a particle diameter of 1.68 to 0.84 mm, both being commercially available as adsorbent for multilayer glass structures, was filled in the spacers. The dew point of the glass structure was measured in the same way as in Example 1. The results are shown in Table 8.

ture was measured in the same way as in Example 1. The results are shown in Table 9.

TABLE 9

| | Ratio of the adsorbents (% by weight) | | Total amount of the adsorbents (g) | Dew point (°C.) | |
|---|---|---|---|---|---|
| Example | Zeolite | Activated carbon | | Initial | After the high temperature high humidity resistant test |
| 5 | 80 | 20 | 15 | −60.0 | −68.0 |
| 6 | 40 | 60 | 10 | −48.0 | −52.0 |

EXAMPLE 7

A multilayer glass structure, 30 cm in length, 30 cm in width and 12 mm in thickness, was constructed in the same way as in Example 1 except that 15 g of a mixed adsorbent composed of 50% by weight of the 4A-type spherical zeolite S-7 having a particle diameter of 1.68 to 0.84 mm produced in Referential Example 3, 30% by weight of silica-alumina gel having a particle diameter of 1.68 to 0.84 mm produced by the method disclosed in Japanese Patent Publications Nos. 17002/1963 and 16347/1965, and 20% by weight of the treated spherical activated carbon S-12 having a particle diameter of 1.68 to 0.84 mm produced in Referential Example 4 was filled in the spacers. The dew point of the glass structure was measured in the same way as in Example 1. The results are shown in Table 10.

TABLE 8

| | Mixing ratio of the adsorbent (wt. %) | | Amount of the adsorbent (g) | Dew point (°C.) | |
|---|---|---|---|---|---|
| Example | Zeolite | Activated carbon | | Initial | After the high temperature high humidity resistant test |
| 1 | 95 | 5 | 15 | −60.0 | −66.5 |
| 2 | 70 | 30 | 7 | −47.0 | −48.0 |
| 3 | 30 | 70 | 10 | −42.0 | −48.0 |
| 4 | 70 | 30 | 12 | −52.0 | −59.0 |
| Comp. Ex. 1 | 100 | 0 | 15 | −32.0 | −21.0 |
| Comp. Ex. 2 | 0 | 100 | 10 | −23.0 | −10.0 |
| Comp. Ex. 3 | zeolite 50 | silica gel 50 | 15 | −42.0 | −33.0 |

EXAMPLE 5

A multilayer glass structure, 30 cm in length, 30 cm in width and 12 mm in thickness, was constructed in the same way as in Example 1 except that 15 g in total of the 4A-type spherical zeolite S-2 having a particle diameter of 1.68 to 0.84 mm produced in Referential Example 1 and the treated spherical activated carbon S-12 having a particle diameter of 1.68 to 0.50 mm produced in Referential Example 4 were separately filled in a ratio of 80:20 in the spacers. The dew point of the glass structure was measured in the same way as in Example 1. The results are shown in Table 9.

EXAMPLE 6

A multilayer glass structure, 30 cm in length, 30 cm in width and 12 mm in thickness, was constructed in the same way as in Example 1 except that 10 g in total of the 4A-type spherical zeolite S-2 having a particle diameter of 1.68 to 0.84 mm produced in Referential Example 1 and the treated spherical activated carbon S-12 having a particle diameter of 1.68 to 0.50 mm produced in Referential Example 4 were filled separately in a ratio of 40:60 in the spacers. The dew point of the glass struc-

TABLE 10

| | Ratio of the adsorbents (wt. %) | | | Total amount of the adsorbents filled (g) | Dew point (°C.) | |
|---|---|---|---|---|---|---|
| Example | Zeolite | Silica-alumina gel | Activated carbon | | Initial | After the high temperature high humidity resistant test |
| 7 | 50 | 30 | 20 | 15.0 | −57.0 | −62.0 |

What we claim is:

1. A multilayer glass structure consisting of a plurality of glass sheets joined at their edge portions through spacers and sealed by a sealant between their edge portions and the outer surfaces of the spacers, that spacer which is located in at least one side of the glass sheets having an adsorbent filled therein; characterized in that said adsorbent comprises a combination of (1) a granular zeolite composed of a core of a synthetic zeolite/clay binder mixture containing the synthetic zeolite in an amount larger than its average content in the granular zeolite and a shell of a synthetic zeolite/clay binder mixture containing the clay binder in an amount larger than its average content in the granular zeolite, the core and the shell in said granular zeolite existing in a weight ratio of from 99:1 to 80:20, the core of said granular zeolite containing said synthetic zeolite and said clay binder in a weight ratio of from 90:10 to 60:40, the shell of said granular zeolite containing said clay binder and said synthetic zeolite in a weight ratio of from 95:5 to 30:70, said shell containing the clay binder in an amount at least 10% larger than the amount of the clay binder in said core, said core and shell being calcined to harden the clay binder, with (2) granular activated carbon having on its surface 1 to 20% by weight, based on the activated carbon, of a coating of a synthetic resin latex.

2. The structure of claim 1 wherein said granular synthetic zeolite and said granular activated carbon are present in a weight ratio of from 95:5 to 30:70.

3. The structure of claim 2 or 1 wherein said adsorbent further comprises not more than 70% by weight, based on the total weight of said granular zeolite and granular activated carbon, of granular alumina-silica gel.

4. The structure of claim 1 wherein the amount of said adsorbent is 20 to 300 g per square meter of the area of the multilayer glass structure.

5. The structure of claim 1, wherein the synthetic zeolite in said granular zeolite is A-type zeolite, X-type zeolite, Y-type zeolite or synthetic mordenite.

6. The structure of claim 1 wherein the clay binder in said granular zeolite is a kaolinite-group clay mineral, a palygorskite-group clay mineral, a smectite-group clay mineral, or allophane.

7. The structure of claim 1 wherein the activated carbon itself in the granular activated carbon has a BET specific surface area of 500 to 2,000 m$^2$/g.

8. The structure of claim 1 wherein the coating of the granular activated carbon is applied in the form of an aqueous emulsion.

9. An adsorbent for multilayer glass structures said adsorbent comprising a combination of (a) a granular zeolite composed of a core of a synthetic zeolite/clay binder mixture containing the synthetic zeolite in an amount larger than its average content in the granular zeolite and a shell of a synthetic zeolite/clay binder mixture containing the clay binder in an amount larger than its average content in the granular zeolite, the core and the shell in said granular zeolite existing in a weight ratio of from 99:1 to 80:20, the core of said granular zeolite containing said synthetic zeolite and said clay binder in a weight ratio of from 90:10 to 60:40, the shell of said granular zeolite containing said clay binder and said synthetic zeolite in a weight ratio of from 95:5 to 30:70, said shell containing the clay binder in an amount at least 10% larger than the amount of the clay binder in said core, said core and shell being calcined to harden the clay binder, and (b) granular activated carbon having at its surface 1 to 20% by weight, based on the activated carbon, of a coating of a synthetic resin latex, the weight ratio of (a) to (b) being from 80:20 to 50:50.

* * * * *